United States Patent
Oh et al.

(10) Patent No.: US 12,415,937 B2
(45) Date of Patent: Sep. 16, 2025

(54) NANOCOMPOSITE BODY, METHOD OF MANUFACTURING THE SAME, AND NANOCOMPOSITE FILM INCLUDING THE NANOCOMPOSITE BODY

(71) Applicants: Samsung Display Co., LTD., Yongin-si (KR); Sogang University Research Foundation, Seoul (KR)

(72) Inventors: Hyunjoon Oh, Yongin-si (KR); Kyungtae Kim, Yongin-si (KR); Boa Kim, Yongin-si (KR); Sanghoon Kim, Yongin-si (KR); Sangil Park, Yongin-si (KR); Heonjung Shin, Yongin-si (KR); Hyejin Oh, Yongin-si (KR); Jeoungsub Lee, Yongin-si (KR); Minhoon Choi, Yongin-si (KR); Taekyung Yang, Seoul (KR); Heewoo Rhee, Seoul (KR); Sungmin Cho, Seoul (KR)

(73) Assignees: Samsung Display Co., Ltd., Yongin-si (KR); Sogang University Research Foundation, Seoul (KR)

( * ) Notice: Subject to any disclaimer, the term of this patent is extended or adjusted under 35 U.S.C. 154(b) by 28 days.

(21) Appl. No.: 18/358,806

(22) Filed: Jul. 25, 2023

(65) Prior Publication Data
US 2024/0010867 A1    Jan. 11, 2024

Related U.S. Application Data

(63) Continuation of application No. 15/994,132, filed on May 31, 2018, now Pat. No. 11,713,403.

(30) Foreign Application Priority Data

Jun. 2, 2017    (KR) .......................... 10-2017-0069072

(51) Int. Cl.
*C09D 175/04*    (2006.01)
*C08G 18/10*    (2006.01)
(Continued)

(52) U.S. Cl.
CPC ........... *C09D 175/04* (2013.01); *C08G 18/10* (2013.01); *C08K 9/08* (2013.01); *C09C 1/043* (2013.01);
(Continued)

(58) Field of Classification Search
None
See application file for complete search history.

(56) References Cited

U.S. PATENT DOCUMENTS 5,683,501 A    11/1997    Tomihisa et al.
9,440,849 B2    9/2016    Archer et al.
(Continued)

FOREIGN PATENT DOCUMENTS

JP    2008-037985 A    2/2008
JP    2013-527879 A    7/2013
(Continued)

OTHER PUBLICATIONS

Lin et al., Progress in Organic Coatings 106 (2017) 145-154.*
(Continued)

*Primary Examiner* — Vu A Nguyen
(74) *Attorney, Agent, or Firm* — Womble Bond Dickinson (US) LLP

(57) ABSTRACT

Provided are a nanocomposite body, a method of manufacturing the nanocomposite body, and a nanocomposite film including the nanocomposite body. The nanocomposite body includes: inorganic particles; a polymer matrix; and grafting polymer chains each of which includes a polyol
(Continued)

structure, wherein the inorganic particles and the polymer matrix are linked by the grafting polymer chains.

13 Claims, 11 Drawing Sheets

(51) Int. Cl.

| | | |
|---|---|---|
| C08K 3/04 | (2006.01) | |
| C08K 3/22 | (2006.01) | |
| C08K 3/36 | (2006.01) | |
| C08K 9/06 | (2006.01) | |
| C08K 9/08 | (2006.01) | |
| C09C 1/04 | (2006.01) | |
| C09C 1/30 | (2006.01) | |
| C09C 1/36 | (2006.01) | |
| C09C 1/40 | (2006.01) | |
| C09C 1/44 | (2006.01) | |
| C09C 3/12 | (2006.01) | |

(52) U.S. Cl.
CPC .......... *C09C 1/3072* (2013.01); *C09C 1/3081* (2013.01); *C09C 1/3684* (2013.01); *C09C 1/407* (2013.01); *C09C 1/44* (2013.01); *C09C 3/12* (2013.01); *C01P 2002/82* (2013.01); *C01P 2002/86* (2013.01); *C01P 2002/88* (2013.01); *C01P 2004/64* (2013.01); *C08K 3/041* (2017.05); *C08K 3/042* (2017.05); *C08K 2003/2227* (2013.01); *C08K 2003/2241* (2013.01); *C08K 2003/2244* (2013.01); *C08K 2003/2296* (2013.01); *C08K 3/36* (2013.01); *C08K 9/06* (2013.01); *C08K 2201/003* (2013.01); *C08K 2201/011* (2013.01)

(56) References Cited

U.S. PATENT DOCUMENTS

| | | | |
|---|---|---|---|
| 9,540,479 | B2 | 1/2017 | Marx et al. |
| 2006/0024500 | A1 | 2/2006 | Seo |
| 2013/0041098 | A1 | 2/2013 | Arkles et al. |
| 2013/0045387 | A1 | 2/2013 | Chu et al. |
| 2014/0275323 | A1 | 9/2014 | Thibodeau et al. |

FOREIGN PATENT DOCUMENTS

| | | | |
|---|---|---|---|
| KR | 10-2011-0115132 A | 10/2011 |
| KR | 10-2012-0106994 A | 9/2012 |
| KR | 10-2013-0124960 A | 11/2013 |
| KR | 10-2015-0129803 A | 11/2015 |
| KR | 10-2016-0107090 A | 9/2016 |

OTHER PUBLICATIONS

Akceoglu, Garbis Atam et al., "Adsorption and desorption of DNA tuned by hydroxyl groups in graphite oxides-based solid extraction material", Colloids and Surfaces B Biointerfaces, 136, 2015, pp. 1-6.

Al-Kandary, Sh. et al., "Morphology and Thermo-Mechanical Properties of Compatibilized Polyimide-Silica Nanocomposites", J. Appl. Polym. Sci., vol. 98, 2005, pp. 2521-2531.

Babu, Kothandapani et al., "Synthesis of Polymer Grafted Magnetite Nanoparticle with the Highest Grafting Density via Controlled Radical Polymerization", Nanoscale Res. Lett., 4, 2009, pp. 1090-1102.

Goff, Jonathan et al., "Silicone Elastomers by Step-Growth Polymerization of Monodisperse Dual Functional Silicones", Polymer Preprints, 53(1), 2012, pp. 486-487.

Jung, D.H. et al., "Organic-inorganic chemical hybrids having shape memory effect", J. Mater. Chem., 20, 2010, pp. 3458-3466.

Lesot, Philippe et al., "Structural-dynamical relationship in silica PEG hybrid gels", J. Mater. Chem., 8(1), 1998, pp. 147-151.

Liu, Ying-Ling et al., "Poly(dimethylsiloxane) Star Polymers Having Nanosized Silica Cores", Marcromolecular Rapid Communications, 25, 2004, pp. 1392-1395.

Shintani, Koji et al., A facile synthesis of hydro- and vinyl-functionalized di- and tetrasiloxanes and polyaddition via hydrosilylation, Polymer Bulletin, 37, 1996, pp. 705-710.

Zhang, Chunxin et al., "Hydrosilylation of Allyl Alcohol with $[HSiMe_2OSiO_{1.5}]8$: Octa(3-hydroxypropyldimethylsiloxy)octasilsesquioxane and Its Octamethacrylate Derivative as Potential Precursors to Hybrid Nanocomposites", J. Am. Chem. Soc., 122, 2000, pp. 6979-6988.

Lin, Baozhong et al., "Poly(ethylene glycol)-grafted silica nanoparticles for highly hydrophilic acrylic-based polyurethane coatings," Elsevier, Progress in Organic Coatings, 106 (2017) pp. 145-154.

Notice of Allowance for corresponding KR Patent Application No. 10-2017-0069072 dated Jan. 24, 2022, 7pp.

Kumar, Sanat K. et al.; "Nanocomposites with Polymer Grafted Nanoparticles"; Macromolecules; 2013; 46; pp. 3199-3214.

* cited by examiner

PU/fumed silica 10 wt%    PU/HNP 10 wt%

FIG. 11

| EVALUATION CRITERIA | PU | PU/FUMED SILICA (10 wt%) | PU/HNP (10 wt%) |
|---|---|---|---|
| S-SD CURVE | | | |
| SHORE HARDNESS | D 21.8 / A 77.4 | D 29.8 / A 81.9 | D 33.7 / A 83.4 |
| ELASTIC MODULUS (MPa) | 9.7 | 33 | 37 |

NANOCOMPOSITE BODY, METHOD OF MANUFACTURING THE SAME, AND NANOCOMPOSITE FILM INCLUDING THE NANOCOMPOSITE BODY

CROSS-REFERENCE TO RELATED APPLICATION

This application is a continuation of U.S. patent application Ser. No. 15/994,132, filed May 31, 2018, which claims priority to and the benefit of Korean Patent Application No. 10-2017-0069072, filed on Jun. 2, 2017, in the Korean Intellectual Property Office, the entire contents of all of which are incorporated herein by reference.

BACKGROUND

1. Field

One or more embodiments relate to a nanocomposite body, a method of manufacturing the nanocomposite body, and a nanocomposite film including the nanocomposite body.

2. Description of the Related Art

Plastic films are thin, virtually non-breakable and have a high degree of freedom in design, which is very useful in the field of electronic devices, for example, in the field of flexible or stretchable displays. However, since a main material of a plastic film is a polymer, the plastic film has a disadvantage in that it has low or poor mechanical properties.

In order to improve the mechanical properties of a plastic film, for example, a polymer film, a method of introducing inorganic particles into a polymer matrix is generally used in the production of a polymer film. However, there is a problem that aggregation of the inorganic particles occurs due to a hydrophilic group on a surface of inorganic particles. In order to solve this problem, there is a technique of introducing hydrophobically modified inorganic particles into a polymer matrix; or treating the surface of inorganic particles with a substance compatible with a matrix and then introducing the particles into a polymer matrix. However, even when an amount of surface-treated inorganic particles increases, aggregation of the inorganic particles still occurs.

SUMMARY

One or more embodiments of the present disclosure include a nanocomposite body, a method of manufacturing the nanocomposite body, and a nanocomposite film including the nanocomposite body.

Additional aspects of embodiments of the present disclosure will be set forth in part in the description which follows and, in part, will be apparent from the description, or may be learned by practice of the presented embodiments.

According to one or more embodiments, a nanocomposite body includes inorganic particles; a polymer matrix; and grafting polymer chains each of which includes a polyol structure, wherein the inorganic particles and the polymer matrix are linked by the grafting polymer chains.

According to one or more embodiments, a method of manufacturing the nanocomposite body includes reacting an inorganic particle with a grafting polymer compound represented by Formula 2 to form a hybrid nanoparticle (HNP), as a first process; and reacting the hybrid nanoparticle with a polymer matrix, as a second process.

According to one or more embodiments, a nanocomposite film includes the nanocomposite body.

BRIEF DESCRIPTION OF THE DRAWINGS

The accompanying drawings, together with the specification, illustrate embodiments of the subject matter of the present disclosure, and, together with the description, serve to explain principles of embodiments of the subject matter of the present disclosure.

FIG. 11 shows the results of measuring Shore hardnesses and elastic moduli of the respective nanocomposite films prepared according to an embodiment and the other nanocomposite film.

DETAILED DESCRIPTION

Figure 1:
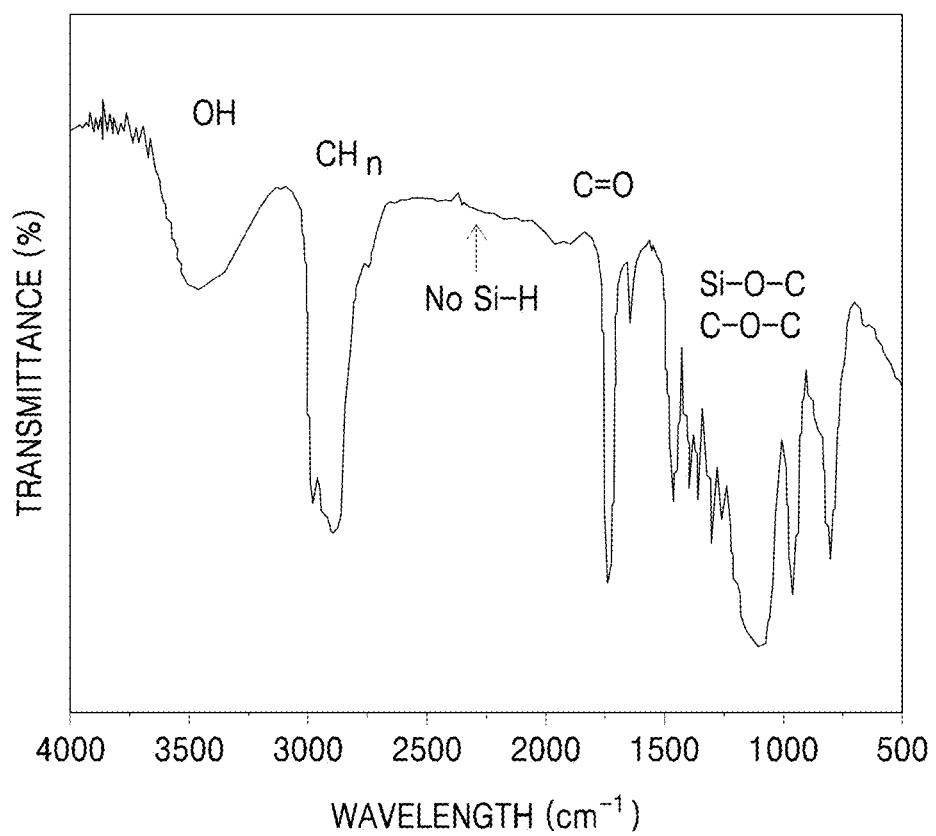
FIG. 1 shows a fourier transform infrared (FT-IR) spectrum of a polyethylene glycol (PEG) compound synthesized according to an embodiment.

Reference will now be made in more detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the drawings, to explain aspects of embodiments of the present description.

According to an embodiment, a nanocomposite body includes: inorganic particles; a polymer matrix; and grafting polymer chains each of which includes a polyol structure, wherein the inorganic particles and the polymer matrix are linked by the grafting polymer chains.

In one embodiment, the inorganic particles and the polymer matrix being "linked" by the grafting polymer chains may denote that an atom of one of the grafting polymer chains chemically binds with (e.g., chemically bonds to) an atom of one of the inorganic particles, and another atom of the grafting polymer chain chemically binds with (e.g., chemically bonds to) an atom of the polymer matrix.

In one embodiment, the inorganic particles may include silica (SiO$_2$) particles, titania (TiO$_2$) particles, zinc oxide (ZnO$_2$) particles, zirconia (ZrO$_2$) particles, alumina (Al$_2$O$_3$) particles, graphene, and/or carbon nanotubes (CNTs). As used herein, the term "inorganic particles" is defined to include carbon nanotubes. As used herein, the term "inorganic particles" may also be replaced with the term "filler particles."

For example, the inorganic particles may be silica (SiO$_2$) particles, but embodiments of the present disclosure are not limited thereto.

In one embodiment, an average particle diameter of the inorganic particles may be in a range of about 1 nm to about 100 μm, or, for example, about 10 nm to about 1 μm.

The inorganic particles are linked to the polymer matrix through the grafting polymer chains and are 3-dimensionally dispersed in the polymer matrix, which may thus result in improvement of mechanical properties, for example, strength or elasticity, of the polymer matrix.

In one embodiment, an amount of the inorganic particles in the polymer matrix may be in a range of about 10 parts to about 50 parts by weight based on 100 parts by weight of the polymer matrix. When the amount of the inorganic particles in the polymer matrix is about 50 parts by weight or less, the inorganic particles may be evenly distributed in the polymer matrix, and when the amount is about 10 parts by weight or more, the mechanical properties of the polymer matrix may be enhanced.

In one embodiment, a polymer of the polymer matrix may include polyurethane, polyester, polyamide, an epoxy resin, polycarbonate, polyethyleneterephthalate, a polyethylene oxide, polyether, or a combination thereof. For example, the polymer matrix may include polyurethane, but embodiments of the present disclosure are not limited thereto.

As used herein, the term "polyol" refers to a repeating unit of a polymer which may include, for example, polyether or polyester.

In one embodiment, the grafting polymer chains may be represented by Formula 1:

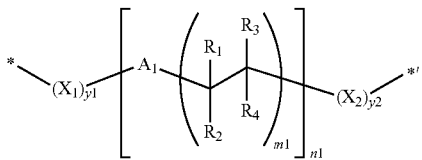

Formula 1

In Formula 1, A$_1$ may be —O— or —C(=O)O—.

In Formula 1, X$_1$ and X$_2$ may each independently be selected from:
  a single bond, —C(=O)—, —O—, a C$_1$-C$_{20}$ alkylene group, a C$_3$-C$_{10}$ cycloalkylene group, a C$_3$-C$_{10}$ cycloalkenylene group, a C$_2$-C$_{10}$ heterocycloalkylene group, a C$_2$-C$_{10}$ heterocycloalkenylene group, a C$_6$-C$_{20}$ arylene group, and a C$_2$-C$_{20}$ heteroarylene group; and
  a C$_1$-C$_{20}$ alkylene group, a C$_3$-C$_{10}$ cycloalkylene group, a C$_3$-C$_{10}$ cycloalkenylene group, a C$_2$-C$_{10}$ heterocycloalkylene group, a C$_2$-C$_{10}$ heterocycloalkenylene group, a C$_6$-C$_{20}$ arylene group, and a C$_2$-C$_{20}$ heteroarylene group, each substituted with at least one selected from deuterium, —F, —Cl, —Br, —I, a hydroxyl group, a cyano group, an epoxy group, a nitro group, an amidino group, a hydrazino group, a hydrazono group, a C$_1$-C$_{20}$ alkyl group, a C$_1$-C$_{20}$ alkoxy group, a C$_3$-C$_{10}$ cycloalkyl group, a C$_3$-C$_{10}$ cycloalkenyl group, a C$_2$-C$_{10}$ heterocycloalkyl group, a C$_2$-C$_{10}$ heterocycloalkenyl group, a C$_6$-C$_{20}$ aryl group, and a C$_2$-C$_{20}$ heteroaryl group.

For example, X$_1$ and X$_2$ may each independently be selected from —C(=O)— and —O—, but embodiments of the present disclosure are not limited thereto.

In Formula 1, y1 may be an integer of 1 to 5, and when y1 is 2 or greater, structures of X$_1$ may be identical to or different from each other.

In Formula 1, y2 may be an integer of 1 to 5, and when y2 is 2 or greater, structures of X$_2$ may be identical to or different from each other.

In Formula 1, R$_1$ to R$_4$ may each independently be selected from:
  hydrogen, deuterium, a C$_1$-C$_{20}$ alkyl group, a C$_2$-C$_{20}$ alkenyl group, a C$_2$-C$_{20}$ alkynyl group, and a C$_1$-C$_{20}$ alkoxy group; and
  a C$_1$-C$_{20}$ alkyl group, a C$_2$-C$_{20}$ alkenyl group, a C$_2$-C$_{20}$ alkynyl group, and a C$_1$-C$_{20}$ alkoxy group, each substituted with at least one selected from deuterium, —F, —Cl, —Br, —I, a hydroxyl group, a cyano group, an epoxy group, a nitro group, an amidino group, a hydrazino group, a hydrazono group, a C$_1$-C$_{20}$ alkyl group, and a C$_1$-C$_{20}$ alkoxy group.

In Formula 1, m1 is an integer of 1 to 10, and when m1 is 2 or greater, structures in parentheses may be identical to or different from each other.

In Formula 1, n1 is an integer of 1 to 1,000, and when n1 is 2 or greater, structures in parentheses may be identical to or different from each other.

In one embodiment, n1 may be an integer of 50 to 500.

In Formula 1, * is a binding site to the inorganic particles, and *' is a binding site to the polymer matrix.

In one embodiment, the grafting polymer chains may include polyethylene glycol (PEG), polylactic acid (PLA), and/or polycaprolactone (PCL), but embodiments of the present disclosure are not limited thereto.

In one embodiment, a method of manufacturing the nanocomposite body includes, as a first process, reacting inorganic particles with a grafting polymer compound represented by Formula 2 to form hybrid nanoparticles; and as a second process, reacting the hybrid nanoparticles with a polymer matrix:

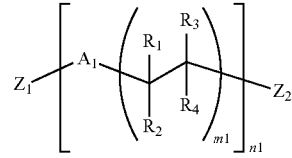

Formula 2

In Formula 2, A$_1$ may be —O— or —C(=O)O—,

In Formula 2, R$_1$ to R$_4$ may each independently be selected from:
  hydrogen, deuterium, a C$_1$-C$_{20}$ alkyl group, a C$_2$-C$_{20}$ alkenyl group, a C$_2$-C$_{20}$ alkynyl group, and a C$_1$-C$_{20}$ alkoxy group; and
  a C$_1$-C$_{20}$ alkyl group, a C$_2$-C$_{20}$ alkenyl group, a C$_2$-C$_{20}$ alkynyl group, and a C$_1$-C$_{20}$ alkoxy group, each substituted with at least one selected from deuterium, —F, —Cl, —Br, —I, a hydroxyl group, a cyano group, an epoxy group, a nitro group, an amidino group, a hydrazino group, a hydrazono group, a $C_1$-$C_{20}$ alkyl group, and a $C_1$-$C_{20}$ alkoxy group.

In Formula 2, m1 is an integer of 1 to 10.

In Formula 2, n1 is an integer of 1 to 1,000.

In Formula 2, $Z_1$ is a substituent that reacts with the inorganic particles.

In one embodiment, $Z_1$ is —O($Q_1$), —S($Q_1$), —Si($Q_1$)($Q_2$)($Q_3$), or an epoxy group, wherein $Q_1$, $Q_2$, and $Q_3$ may each independently be selected from hydrogen, deuterium, —F, —Cl, —Br, —I, a hydroxyl group, a cyano group, a nitro group, an amidino group, a hydrazino group, a hydrazono group, a $C_1$-$C_{60}$ alkyl group, a $C_2$-$C_{60}$ alkenyl group, a $C_2$-$C_{60}$ alkynyl group, a $C_1$-$C_{60}$ alkoxy group, a $C_1$-$C_{10}$ cycloalkyl group, a $C_1$-$C_{10}$ heterocycloalkyl group, a $C_3$-$C_{10}$ cycloalkenyl group, a $C_1$-$C_{10}$ heterocycloalkenyl group, a $C_6$-$C_{60}$ aryl group, a $C_1$-$C_{60}$ heteroaryl group, a monovalent non-aromatic condensed polycyclic group, a monovalent non-aromatic hetero-condensed polycyclic group, a biphenyl group, and a terphenyl group.

For example, $Z_1$ may be —Si($Q_{11}$)($Q_{12}$)($Q_{13}$), wherein $Q_{11}$, $Q_{12}$, and $Q_{13}$ may each independently be a $C_1$-$C_{20}$ alkyl group or a $C_1$-$C_{20}$ alkoxy group, but embodiments of the present disclosure are not limited thereto.

In another embodiment, $Z_1$ may be —OH, —Si($OC_2H_5$)$_3$, or an epoxy group.

In Formula 2, $Z_2$ is a substituent that reacts with the polymer matrix.

In one embodiment, $Z_2$ may be —O($Q_{21}$), —S($Q_{21}$), —N($Q_{21}$)($Q_{22}$), —Si($Q_{21}$)($Q_{22}$)($Q_{23}$), an isocyanate group, a carbonate group, or an epoxy group, wherein $Q_{21}$, $Q_{22}$, and $Q_{23}$ are each independently selected from hydrogen, deuterium, —F, —Cl, —Br, —I, a hydroxyl group, a cyano group, a nitro group, an amidino group, a hydrazino group, a hydrazono group, a $C_1$-$C_{60}$ alkyl group, a $C_2$-$C_{60}$ alkenyl group, a $C_2$-$C_{60}$ alkynyl group, a $C_1$-$C_{60}$ alkoxy group, a $C_3$-$C_{10}$ cycloalkyl group, a $C_1$-$C_{10}$ heterocycloalkyl group, a $C_3$-$C_{10}$ cycloalkenyl group, a $C_1$-$C_{10}$ heterocycloalkenyl group, a $C_6$-$C_{60}$ aryl group, a $C_1$-$C_{60}$ heteroaryl group, a monovalent non-aromatic condensed polycyclic group, a monovalent non-aromatic hetero-condensed polycyclic group, a biphenyl group, and a terphenyl group.

For example, $Z_1$ may be —Si($Q_{31}$)($Q_{32}$)($Q_{33}$), wherein $Q_{31}$, $Q_{32}$, and $Q_{33}$ are each independently a $C_1$-$C_{20}$ alkyl group or a $C_1$-$C_{20}$ alkoxy group, but embodiments of the present disclosure are not limited thereto.

In another embodiment, $Z_2$ may be —OH, —Si(OH)$_3$, or an epoxy group, but embodiments of the present disclosure are not limited thereto.

In one embodiment, the inorganic particles may be silica (SiO$_2$) particles, titania (TiO$_2$) particles, zinc oxide (ZnO$_2$) particles, zirconia (ZrO$_2$) particles, alumina (Al$_2$O$_3$) particles, graphene, and/or carbon nanotubes (CNTs). As used herein, the term "inorganic particles" is defined to include carbon nanotubes. As used herein, the term "inorganic particles" may also be replaced with the term "filler particles."

In one embodiment, the inorganic particles may include (e.g., may each include) a first functional group on a surface thereof, wherein the first functional group may include at least one selected from a silanol group, a hydroxyl group, and an alkoxy group, and the first functional group may react with $Z_1$ in Formula 2.

For example, the inorganic particles may be silica particles, wherein the inorganic particles may include a silanol group on a surface thereof, and the silanol group may react with $Z_1$ in Formula 2, but embodiments of the present disclosure are not limited thereto.

For example, the silanol group included on a surface of the inorganic particles may react with $Z_1$ in Formula 2, and $Z_1$ may be —Si(OC$_2$H$_5$)$_3$.

Also, the above description of the inorganic particles may be applied to the inorganic particles used in the method of manufacturing the nanocomposite body.

In one embodiment, an amount of the grafting polymer compound represented by Formula 2 may be in a range of about 1 part to about 1,000 parts by weight based on 100 parts by weight of the inorganic particles. When the amount of the grafting polymer compound is within this range, grafting of the grafting polymer compound with respect to the inorganic particles may suitably or effectively occur.

In one embodiment, in the first process, a reaction between the inorganic particles and the grafting polymer compound represented by Formula 2 may be a sol-gel reaction.

In another embodiment, in the first process, the inorganic particles and the grafting polymer compound represented by Formula 2 may react under the presence of a platinum catalyst. The platinum catalyst may be, for example, H$_2$PtCl$_6$, PtO$_2$, Pt(dvs), or Pt(dcp).

The first process may proceed, for example, into two pathways of C-silylation and O-silylation as shown in Reaction Scheme 1.

Reaction Scheme 1

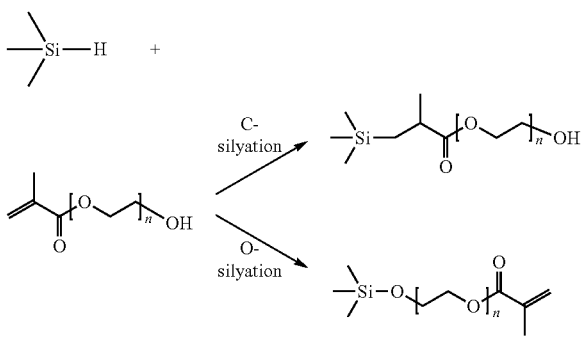

In one embodiment, when a selective structure below is formed by using the platinum catalyst, the first process may follow C-silylation among the two pathways shown in Reaction Scheme 1.

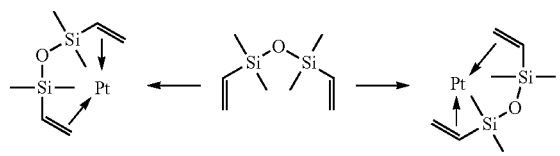

While these reaction pathways are provided herein to help understanding of an embodiment of the present disclosure, the embodiments of the present disclosure are not limited to any particular mechanism or theory.

In one embodiment, a polymer of the polymer matrix may include polyurethane, polyester, polyamide, an epoxy resin, polycarbonate, polyethyleneterephthalate, a polyethylene oxide, polyether, or a combination thereof.

In one embodiment, the polymer matrix may include a second functional group, wherein the second functional group may include at least one selected from an isocyanate group, an epoxy group, a hydroxyl group, an amine group, and a carbonate group, and the second functional group may react with $Z_2$ in Formula 2.

For example, the polymer matrix may include polyurethane. The polymer matrix may include an isocyanate group, and the isocyanate group may react with $Z_2$ in Formula 2, but embodiments of the present disclosure are not limited thereto.

For example, the isocyanate group in the polymer matrix may react with $Z_2$ in Formula 2, and $Z_2$ may be —OH.

In one embodiment, an amount of the hybrid nanoparticles in the polymer matrix may be in a range of about 10 parts to about 50 parts by weight based on 100 parts by weight of the polymer matrix. When the amount of the hybrid nanoparticles in the polymer matrix is about 50 parts by weight or less, the hybrid nanoparticles may be substantially evenly distributed in the polymer matrix, and when the amount is about 10 parts by weight or more, mechanical properties of the polymer matrix may be enhanced.

According to another embodiment, provided is a nanocomposite film including the nanocomposite body.

In one embodiment, a shore D hardness of the nanocomposite film is in a range of about 30 C to about 60 C, or, for example, about 32 D to about 42 D.

In another embodiment, a shore A hardness of the nanocomposite film is in a range of about 80 C to about 120 C, or, for example, about 82 D to about 102 D.

In one embodiment, an elastic modulus of the nanocomposite film may be in a range of about 30 MPa to about 100 MPa, or, for example, about 35 MPa to about 40 MPa.

The term "$C_1$-$C_{60}$ alkyl group," as used herein, refers to a linear or branched aliphatic hydrocarbon monovalent group having 1 to 60 carbon atoms, and examples thereof include a methyl group, an ethyl group, a propyl group, an isobutyl group, a sec-butyl group, a tert-butyl group, a pentyl group, an iso-amyl group, and a hexyl group. The term "$C_1$-$C_{60}$ alkylene group," as used herein, refers to a divalent group having substantially the same structure as the $C_1$-$C_{60}$ alkyl group, except that the $C_1$-$C_{60}$ alkylene group is divalent.

The term "$C_2$-$C_{60}$ alkenyl group," as used herein, refers to a hydrocarbon group formed by substituting at least one carbon (C) double bond at a main chain (e.g., in the middle) or at a terminal end of the $C_2$-$C_{60}$ alkyl group, and examples thereof include an ethenyl group, a propenyl group, and a butenyl group. The term "$C_2$-$C_{60}$ alkenylene group," as used herein, refers to a divalent group having substantially the same structure as the $C_2$-$C_{60}$ alkenyl group, except that the $C_2$-$C_{60}$ alkenylene group is divalent.

The term "$C_2$-$C_{60}$ alkynyl group," as used herein, refers to a hydrocarbon group formed by substituting at least one carbon (C) triple bond at a main chain (e.g., in the middle) or at a terminal end of the $C_2$-$C_{60}$ alkyl group, and examples thereof include an ethynyl group and a propynyl group. The term "$C_2$-$C_{60}$ alkynylene group," as used herein, refers to a divalent group having substantially the same structure as the $C_2$-$C_{60}$ alkynyl group, except that the $C_2$-$C_{60}$ alkynylene group is divalent.

The term "$C_1$-$C_{60}$ alkoxy group," as used herein, refers to a monovalent group represented by —$OA_{101}$ (wherein $A_{101}$ is the $C_1$-$C_{60}$ alkyl group), and examples thereof include a methoxy group, an ethoxy group, and an isopropyloxy group.

The term "$C_3$-$C_{10}$ cycloalkyl group," as used herein, refers to a monovalent hydrocarbon monocyclic group having 3 to 10 carbon atoms, and non-limiting examples thereof include a cyclopropyl group, a cyclobutyl group, a cyclopentyl group, a cyclohexyl group, and a cycloheptyl group. The term "$C_3$-$C_{10}$ cycloalkylene group," as used herein, refers to a divalent group having substantially the same structure as the $C_3$-$C_{10}$ cycloalkyl group, except that $C_3$-$C_{10}$ cycloalkylene group is divalent.

The term "$C_1$-$C_{10}$ heterocycloalkyl group," as used herein, refers to a monovalent monocyclic group having at least one heteroatom selected from N, O, Si, P, and S as a ring-forming atom and 1 to 10 carbon atoms, and examples thereof include a 1,2,3,4-oxatriazolidinyl group, a tetrahydrofuranyl group, and a tetrahydrothiophenyl group. The term "$C_1$-$C_{10}$ heterocycloalkylene group," as used herein, refers to a divalent group having substantially the same structure as the $C_1$-$C_{10}$ heterocycloalkyl group, except that the $C_1$-$C_{10}$ heterocycloalkylene group is divalent.

The term "$C_3$-$C_{10}$ cycloalkenyl group," as used herein, refers to a monovalent monocyclic group that has 3 to 10 carbon atoms and at least one double bond in the ring thereof and does not have aromaticity, and examples thereof include a cyclopentenyl group, a cyclohexenyl group, and a cycloheptenyl group. The term "$C_3$-$C_{10}$ cycloalkenylene group," as used herein, refers to a divalent group having substantially the same structure as the $C_3$-$C_{10}$ cycloalkenyl group, except that the $C_3$-$C_{10}$ cycloalkenyl group is divalent.

The term "$C_1$-$C_{10}$ heterocycloalkenyl group," as used herein, refers to a monovalent monocyclic group that has at least one heteroatom selected from N, O, Si, P, and S as a ring-forming atom, 1 to 10 carbon atoms, and at least one double bond in its ring. Examples of the $C_1$-$C_{10}$ heterocycloalkenyl group include a 4,5-dihydro-1,2,3,4-oxatriazolyl-group, a 2,3-dihydrofuranyl group and a 2,3-dihydrothiophenyl group. The term "$C_1$-$C_{10}$ heterocycloalkenylene group," as used herein, refers to a divalent group having substantially the same structure as the $C_1$-$C_{10}$ heterocycloalkenyl group, except that the $C_1$-$C_{10}$ heterocycloalkenylene group is divalent.

The term "$C_6$-$C_{60}$ aryl group," as used herein, refers to a monovalent group having a carbocyclic aromatic system having 6 to 60 carbon atoms, and the term "$C_6$-$C_{60}$ arylene group," as used herein, refers to a divalent group having a carbocyclic aromatic system having 6 to 60 carbon atoms. Examples of the $C_6$-$C_{60}$ aryl group include a phenyl group, a naphthyl group, an anthracenyl group, a phenanthrenyl group, a pyrenyl group, and a chrysenyl group. When the $C_6$-$C_{60}$ aryl group and the $C_6$-$C_{60}$ arylene group each include two or more rings, the rings may be fused to each other (e.g., combined together).

The term "$C_1$-$C_{60}$ heteroaryl group," as used herein, refers to a monovalent group having a carbocyclic aromatic system that has at least one heteroatom selected from N, O, Si, P, and S as a ring-forming atom, and 1 to 60 carbon atoms. The term "$C_1$-$C_{60}$ heteroarylene group," as used herein refers to a divalent group having a carbocyclic aromatic system that has at least one heteroatom selected from N, O, Si, P, and S as a ring-forming atom, and 1 to 60 carbon atoms. Examples of the $C_1$-$C_{60}$ heteroaryl group include a pyridinyl group, a pyrimidinyl group, a pyrazinyl group, a pyridazinyl group, a triazinyl group, a quinolinyl group, and an isoquinolinyl group. When the $C_1$-$C_{60}$ heteroaryl group and the $C_1$-$C_{60}$ heteroarylene group each include two or more rings, the rings may be fused to each other (e.g., combined together).

The term "$C_6$-$C_{60}$ aryloxy group," as used herein refers to a group represented by —$OA_{102}$ (where $A_{102}$ is the $C_6$-$C_{60}$ aryl group), and the term "$C_6$-$C_{60}$ arylthio group," as used herein refers to a group represented by —$SA_{103}$ (where $A_{103}$ is the $C_6$-$C_{60}$ aryl group).

The term "monovalent non-aromatic condensed polycyclic group," as used herein refers to a monovalent group that has two or more rings condensed to each other (e.g., combined together), and has only carbon atoms as ring-forming atoms (where the number of carbon atoms may be in a range of 8 to 60), wherein the molecular structure as a whole is non-aromatic. An example of the monovalent non-aromatic condensed polycyclic group may include a fluorenyl group. The term "divalent non-aromatic condensed polycyclic group," as used herein refers to a divalent group having substantially the same structure as the monovalent non-aromatic condensed polycyclic group, except that the divalent non-aromatic condensed polycyclic group is divalent.

The term "monovalent non-aromatic condensed heteropolycyclic group," as used herein may refer to a monovalent group that has two or more rings condensed to each other (e.g., combined together), has a hetero atom selected from N, O, Si, P, and S as a ring-forming atom, and includes carbon atoms (the number of carbon atoms may be in a range of 1 to 60), wherein the molecular structure as a whole is non-aromatic. The term "divalent non-aromatic condensed hetero-polycyclic group," as used herein may refer to a divalent group having substantially the same structure as the monovalent non-aromatic condensed hetero-polycyclic group, except that the divalent non-aromatic condensed hetero-polycyclic group is divalent.

Hereinafter, embodiments will be described by referring to the following Examples without limiting the scope of the present disclosure.

EXAMPLE

Example 1: Preparation of Hybrid Nanoparticles

1) Synthesis of Grafting Polymer Compound

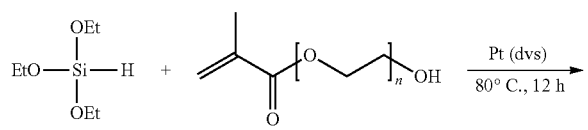

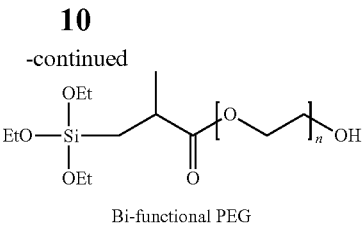

Bi-functional PEG

Triethoxysilane and 500 g/mol of polyethylene glycol methacrylate (PEGMA) at a molar ratio of 1:1 were dissolved in anhydrous toluene to prepare a solution mixture. 0.2 ml of Karstedt's catalyst [PT(dvs), 2 wt % in xylene] as a catalyst was introduced thereto, and the mixture was stirred for 30 minutes at room temperature. Then, a temperature of the mixture was increased to 80° C. to proceed hydrosilylation for 12 hours.

Once the hydrosilylation was completed, the mixture was stirred at room temperature for 2 hours to be adsorbed to the catalyst by using activated carbon and was filtered by using a column formed of silica gel and sellaite. A solvent in the solution mixture was removed by reducing a pressure for 2 hours at 60° C. to obtain a PEG compound, which is a grafting polymer compound. A structure of the PEG compound was confirmed by using fourier transform infrared (FT-IR) spectroscopy and proton nuclear magnetic resonance ($^1$H-NMR) spectroscopy.

Figure 2:
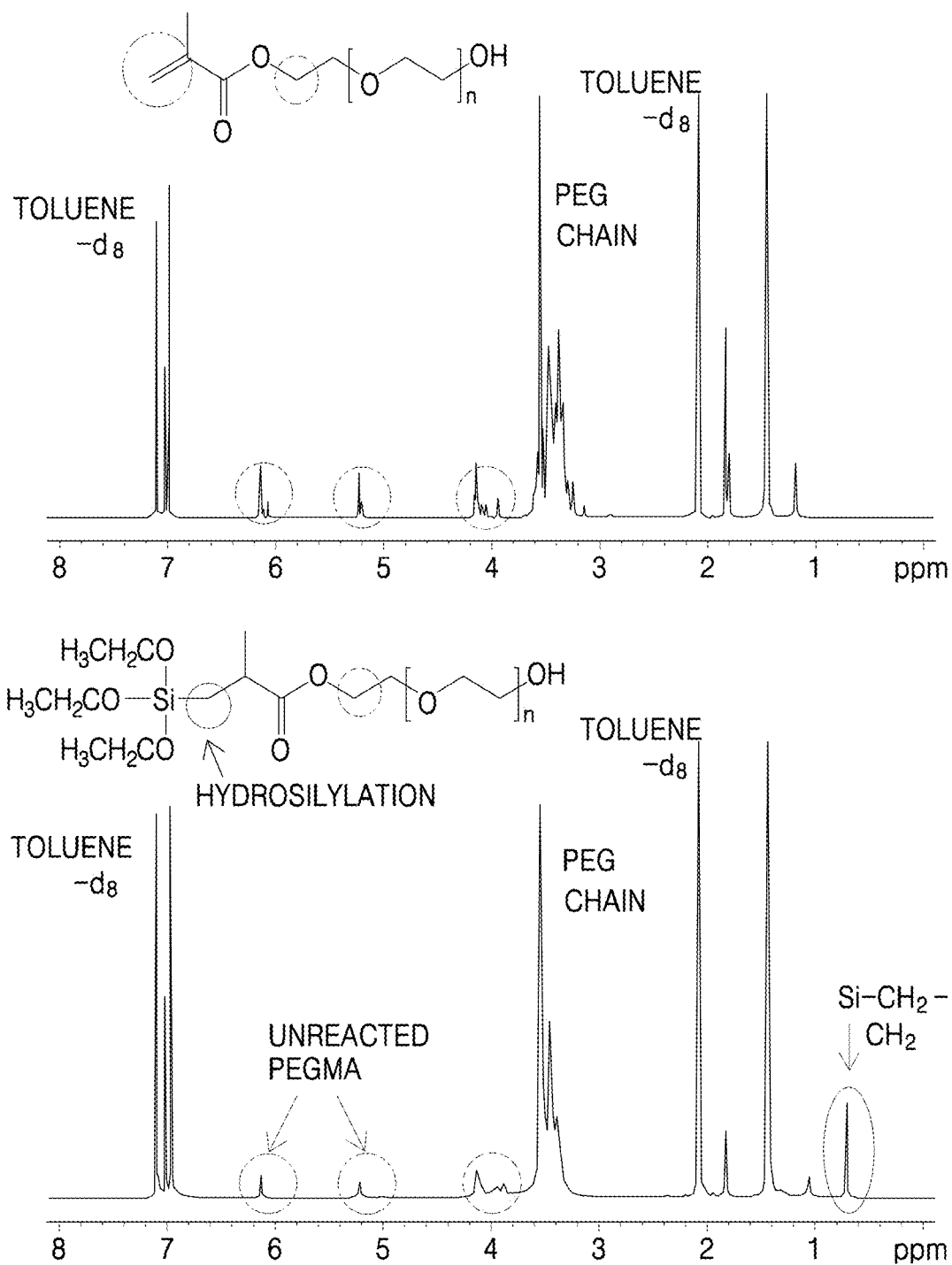
FIG. 2 shows a $^{1}$H-nuclear magnetic resonance (NMR) spectrum of polyethylene glycol methacrylate (PEGMA) and a $^{1}$H-NMR spectrum of a PEG compound synthesized according to an embodiment.

An FT-IR spectrum of the synthesized PEG compound is shown in FIG. 1. A $^1$H-NMR spectrum of PEGMA, which is the reactant, and a $^1$H-NMR spectrum of the synthesized PEG compound are shown in FIG. 2.

2) Synthesis of Hybrid Nanoparticles

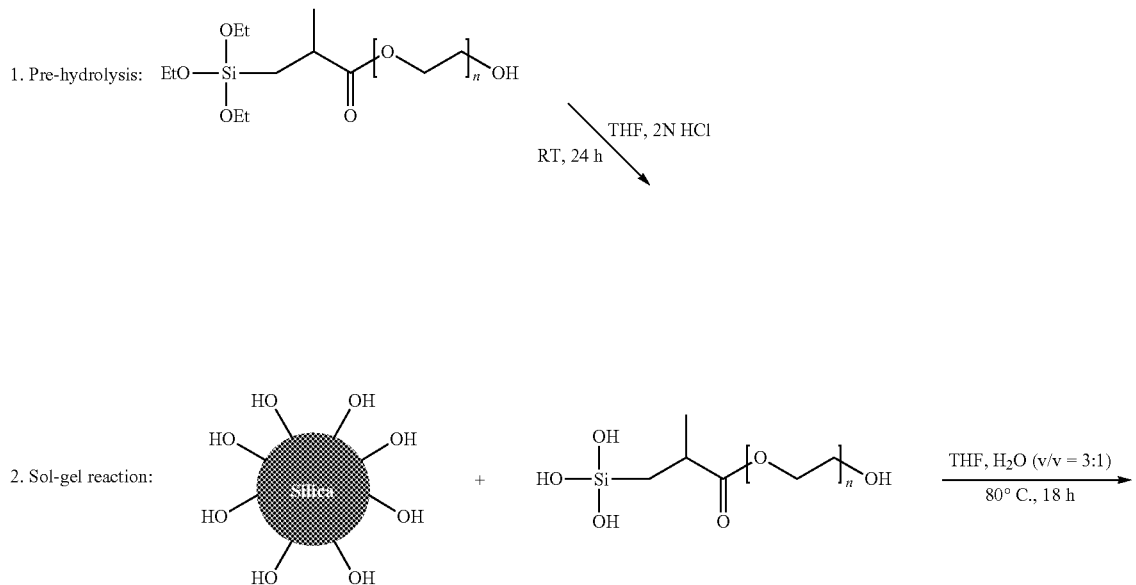

-continued

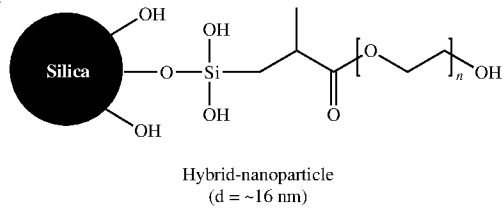

Hybrid-nanoparticle
(d = ~16 nm)

6 g of fumed silica nanoparticles (having a particle diameter of 7 nm, available from Sigma-Aldrich) was sonicated for 24 hours in 100 ml of a solvent mixture including tetrahydrofuran (THF, available from Sigma-Aldrich) and distilled water (v/v=3:1)

18 g of the synthesized PEG compound was pre-hydrolyzed by using a 2 N hydrochloric aqueous solution and was introduced to the fumed silica nanoparticles-dispersed solvent. The resultant was stirred at 80° C. for 18 hours to allow a sol-gel reaction, and then diethyl ether, which is a solvent having a low solubility, was added thereto. A precipitate thus formed was filtered and dried at 80° C. for 1 hour.

The dried precipitate was washed with toluene and ethanol to remove residual PEG, and then the resultant was dried at 80° C. for 12 hours to obtain hybrid nanoparticles.

Example 2: Observation of Synthesis of Hybrid Nanoparticles

A structure of hybrid nanoparticles was observed by using FT-IR spectroscopy and NMR spectroscopy.

Figure 3:
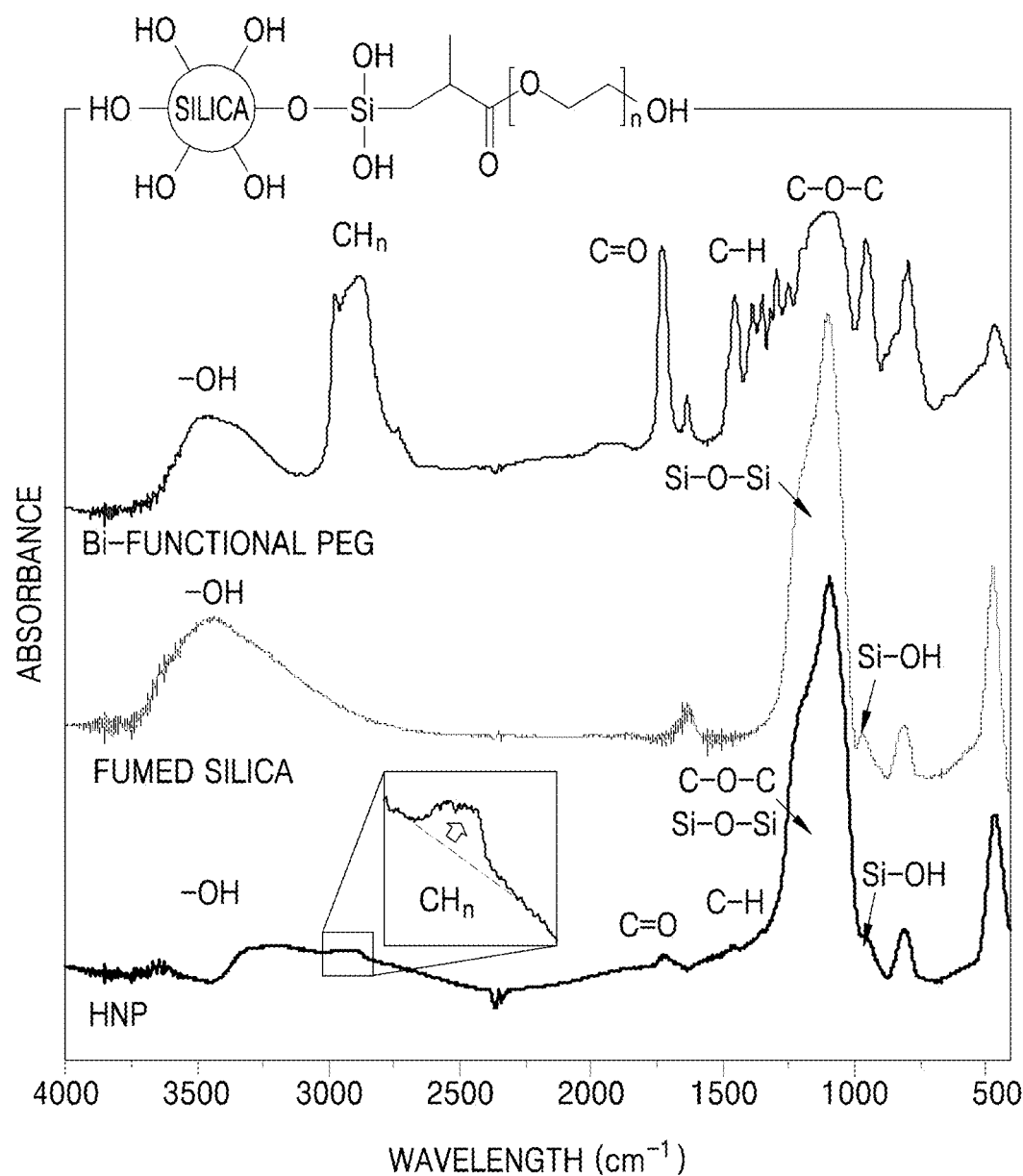
FIG. 3 shows an FT-IR spectrum of hybrid nanoparticles synthesized according to an embodiment.
Figure 4:
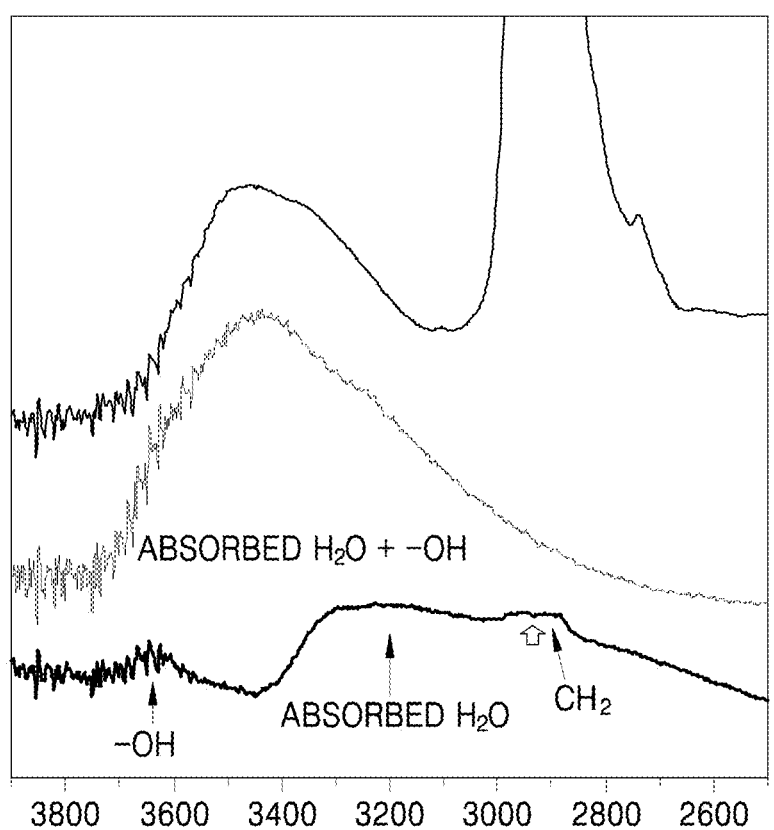
FIGS. 4-5 each show a portion of the FT-IR spectrum shown in FIG. 3.
Figure 5:
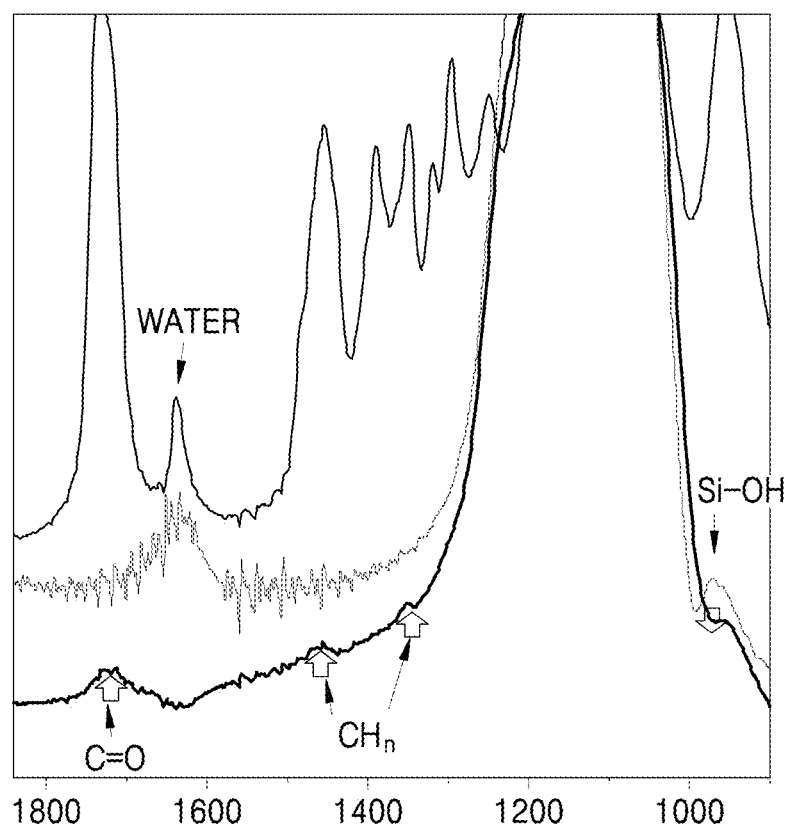

An FT-IR spectrum of the synthesized hybrid nanoparticles is shown in FIG. 3. A part of the FT-IR spectrum of FIG. 3 is enlarged and shown FIGS. 4-5.

Figure 6:
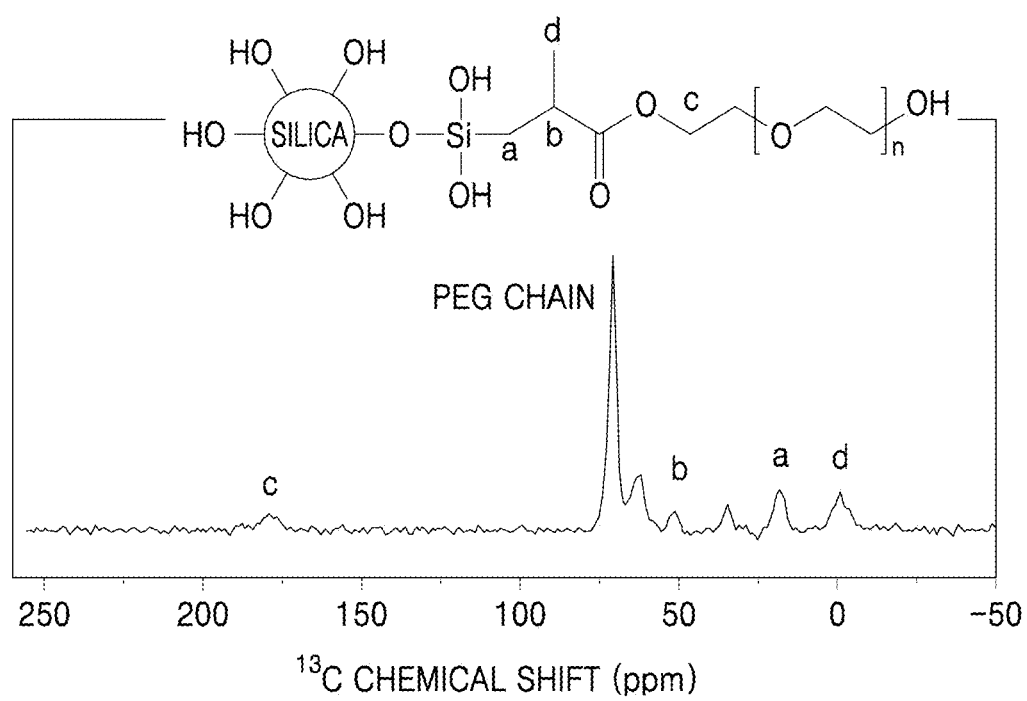
FIGS. 6-7 each shows a $^{13}$C-NMR spectrum and a $^{29}$Si-NMR spectrum of the hybrid nanoparticles synthesized according to an embodiment, respectively.
Figure 7:
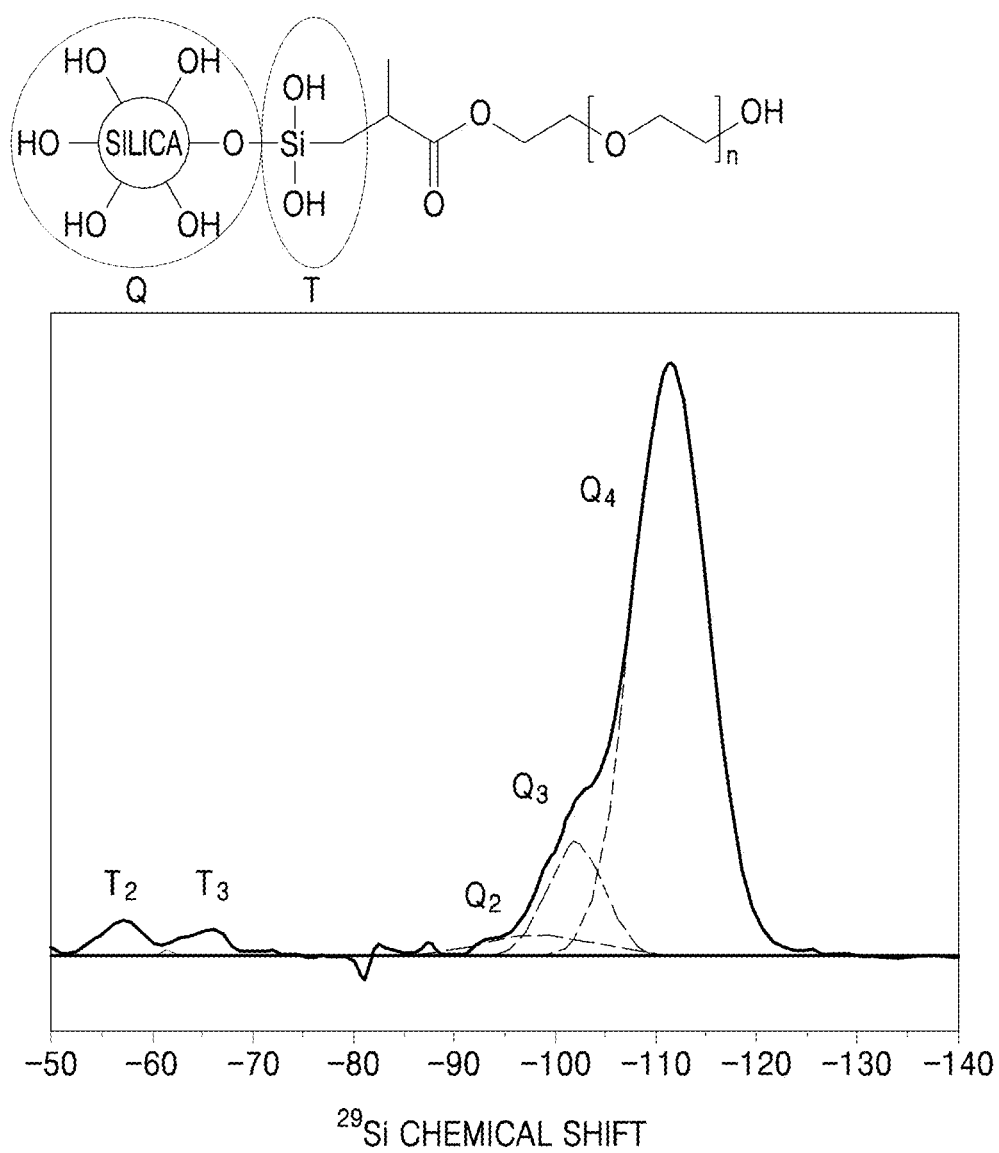

Also, a $^{13}$C-NMR spectrum and a $^{29}$Si-NMR spectrum of the synthesized hybrid nanoparticles are shown in FIGS. 6-7, respectively.

Referring to FIG. 6, it was confirmed that a structure of the PEG compound is maintained in the hybrid nanoparticles. Also, referring to FIG. 7, it was confirmed that a structure shown by "T" is formed, which indicates that a chemical bond is formed by a sol-gel reaction between the PEG compound and a silanol group of the fumed silica nanoparticles.

Figure 8:
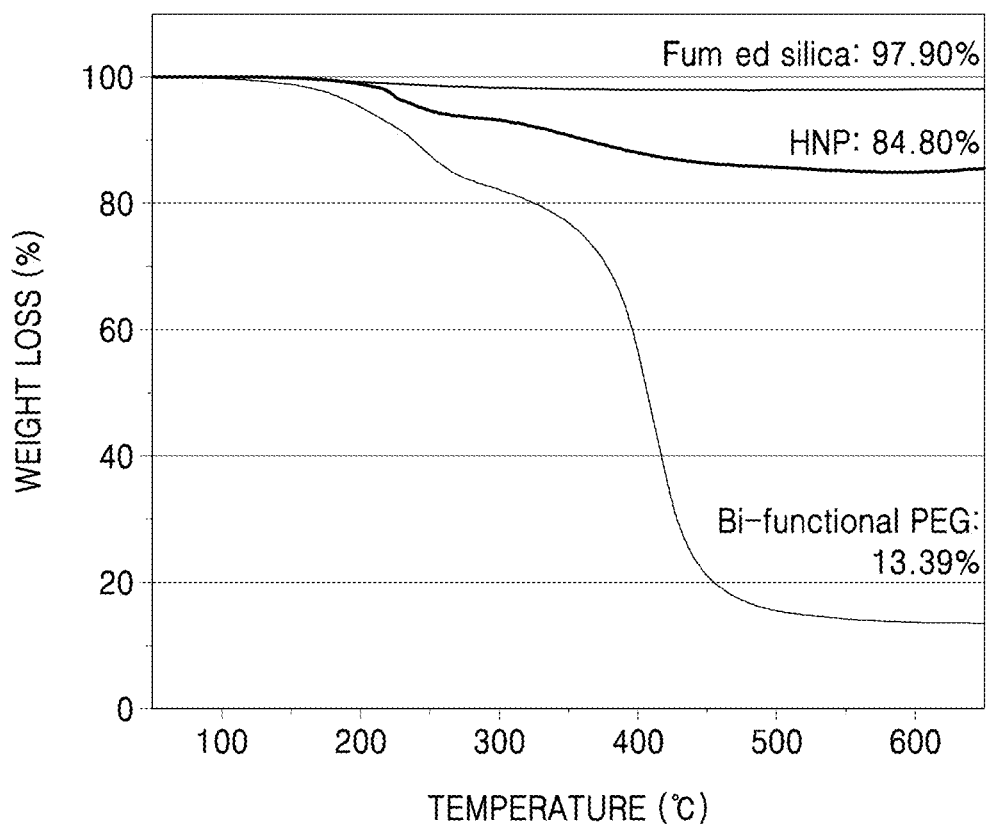
FIG. 8 shows the results of thermogravimetric analysis (TGA) performed on the PEG compound and the hybrid nanoparticles synthesized according to embodiments.

Example 3: Thermogravimetric Analysis of Hybrid Nanoparticles and Grafting Density Evaluation The results of thermogravimetric analysis (TGA) of the synthesized PEG compound and hybrid nanoparticles are shown in FIG. 8. Referring to FIG. 8, grafting densities were calculated according to Equation 1.

$$\text{Grafting density} \atop (\mu\text{mol/m}^2) = \frac{\left[\frac{\Delta W_{HNP}}{(100 - \Delta W_{HNP})}\right] \times 100 - \Delta W_{silica}}{MS_{spec} \times 100} \times 10^6 \quad \text{Equation 1}$$

$$= \frac{\left[\frac{15.20}{100 - 15.20}\right] \times 100 - 2.10}{[(664.27 \text{ g/mol} \times (1 - 0.1339)] \times (\sim 390 \text{ m}^2/\text{g}) \times 100} \times 10^6$$

$$= \sim 0.7 \ \mu\text{mol/m}^2 = \sim 0.42/\text{nm}^2$$

In Equation 1, $\Delta W_{HNP}$ represents a weight loss (%) of the hybrid nanoparticles, $\Delta W_{silica}$ represents a weight loss (%) of the fumed silica nanoparticles, M represents a molecular weight of a part of a molecular weight (664.27 g/mol) that is thermally decomposed during thermogravimetric analysis, and $S_{spec}$ represents a surface area of fumed silica (available from Sigma-Aldrich).

Example 4: Analysis of Average Particle Diameters of Hybrid Nanoparticles

Figure 9:
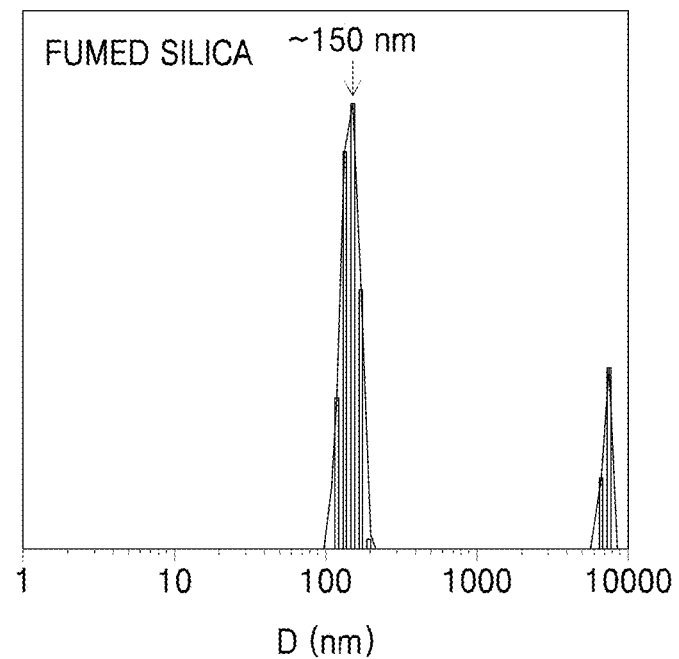
FIG. 9 shows the results of measuring sizes of each of the hybrid nanoparticles synthesized according to an embodiment in an organic solvent and sizes of fumed silica nanoparticles that are unreacted with the PEG compound, synthesized according to an embodiment, in an organic solvent.
Figure 9:
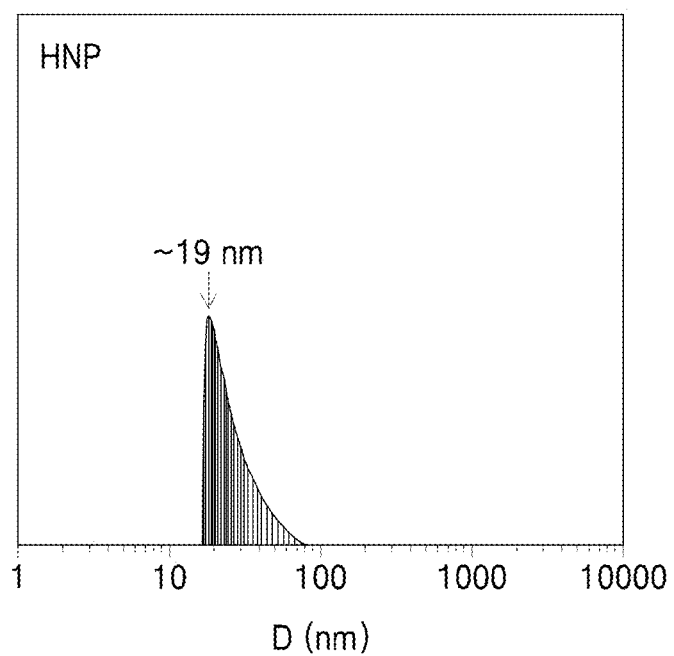

Average particle diameters of the hybrid nanoparticles synthesized in an organic solvent and fumed silica nanoparticles that were not reacted with the PEG compound were analyzed by using a zeta potential and particle size analyzer, and the results are shown in FIG. 9. In the particle diameter analysis, each type (or kind) of particles was added to 1 wt % of ethanol and sonicated for 5 minutes to prepare a suspension, the suspension was filtered by using a 0.2 μm filter, and a size of the particles was measured by using the zeta potential and particle size analyzer.

Referring to FIG. 9, it was confirmed that the hybrid nanoparticles had improved dispersibility in an organic solvent compared to that of fumed silica nanoparticles and thus may be dispersed in the organic solvent as particles of a small size that are not aggregated.

Example 5: Preparation of Nanocomposite Film

Polyurethane prepolymer (PU prepolymer) and the hybrid nanoparticles were each dispersed in THF at an amount of 33 wt % based on the total weight of the mixture, and the hybrid nanoparticles was introduced so that an amount thereof was 10 wt % based on the total weight of the mixture. Then, the mixture was stirred at room temperature for 3 hours.

The resulting solution was applied to release paper by using a coating device and hardened at 80° C. for 6 hours to prepare a nanocomposite film.

Example 6: Observation of Physical Properties of Nanocomposite Film

Figure 10:
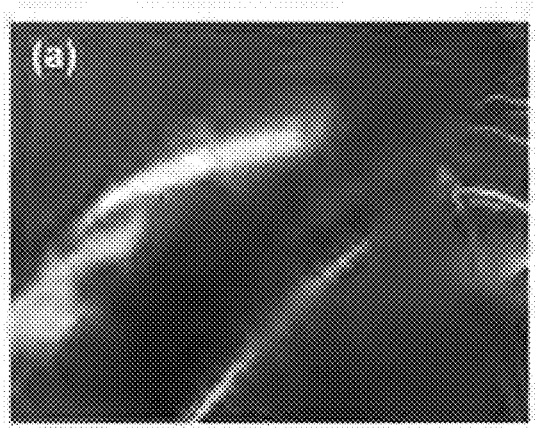
FIG. 10 is an image of a nanocomposite film prepared according to an embodiment and another nanocomposite film.
Figure 10:
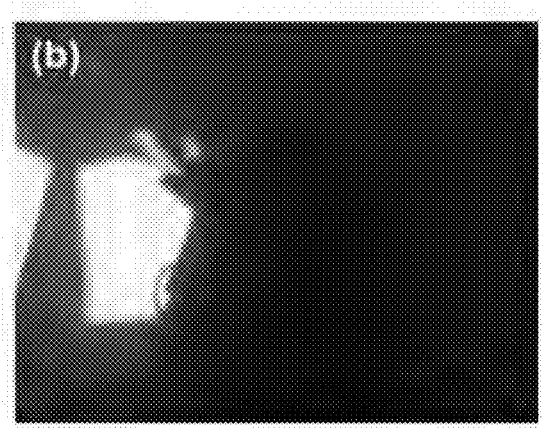

Physical properties of the nanocomposite film and a nanocomposite film prepared by using fumed silica nanoparticles instead of the hybrid nanoparticles were observed by the naked eye, and their images are shown in FIG. 10.

Referring to FIG. 10, an aggregation of particles occurred in the nanocomposite film prepared by using the fumed silica nanoparticles which did not easily form a film, and thus cracks were formed on a surface of the film, whereas a nanocomposite film prepared by using the hybrid nanoparticles had increased compatibility and reactivity which were substantially evenly introduced in the film. Therefore, it was confirmed that the nanocomposite film had the hybrid nanoparticles that were substantially evenly distributed.

Example 7: Evaluation of Shore Hardness and Elastic Modulus of Nanocomposite Film Shore hardnesses of a polyurethane film, a film prepared by introducing fumed silica particles to polyurethane, and a nanocomposite film prepared by introducing the hybrid nanoparticles to polyurethane were each measured according to ASTM D2240 and elastic moduli thereof according to ASTM D638 and D882, and the results are shown in FIG. 11.

Referring to FIG. 11, it was confirmed that the nanocomposite film prepared by introducing hybrid nanoparticles to polyurethane according to an embodiment had excellent properties of improved hardness and elastic modulus compared to those of a film prepared by fumed silica particles.

As described above, according to one or more embodiments, the nanocomposite body has improved mechanical properties of a polymer matrix by including inorganic particles, and as grafting polymer chains link the inorganic particles and the polymer matrix, compatibility with the matrix improves. Also, the compatibility may be easily controlled by controlling a length of the grafting polymer chain.

It should be understood that embodiments described herein should be considered in a descriptive sense only and not for purposes of limitation. Descriptions of features or aspects within each embodiment should typically be considered as available for other similar features or aspects in other embodiments.

As used herein, the terms "combination thereof" and "combinations thereof" may refer to a chemical combination (e.g., an alloy or chemical compound), a mixture, or a laminated structure of components.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises," "comprising," "includes," and "including," when used in this specification, specify the presence of the stated features, integers, acts, operations, elements, and/or components, but do not preclude the presence or addition of one or more other features, integers, acts, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the terms "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively. Also, the term "exemplary" is intended to refer to an example or illustration.

Also, any numerical range recited herein is intended to include all subranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

While one or more embodiments have been described with reference to the drawings, it will be understood by those of ordinary skill in the art that various changes in form and details may be made therein without departing from the spirit and scope as defined by the following claims, and equivalents thereof.

What is claimed is:

1. A nanocomposite comprising:
   inorganic particles, wherein the inorganic particles comprise silica ($SiO_2$) particles, titania ($TiO_2$) particles, zinc oxide ($ZnO_2$) particles, zirconia ($ZrO_2$) particles, alumina ($Al_2O_3$) particles, graphene, and/or carbon nanotubes (CNTs);
   a polymer matrix comprising polyurethane, polyamide, polycarbonate, polyether, or a combination thereof; and grafting polymer chains each of which comprises a polyol structure, wherein the grafting polymer chains are bonded to the inorganic particles and the polymer matrix with a chemical bond, wherein the grafting polymer chains comprise polylactic acid (PLA) or are represented by Formula 1:

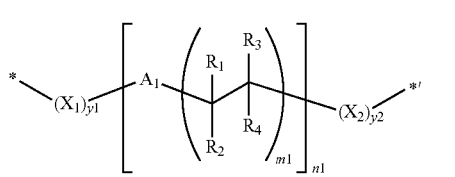

Formula 1 wherein, in Formula 1, $A_1$ is —O— or —C(=O)O—, $X_1$ and $X_2$ are each independently selected from:

a single bond, —C(=O)—, —O—, a $C_1$-$C_{20}$ alkylene group, a $C_3$-$C_{10}$ cycloalkylene group, a $C_3$-$C_{10}$ cycloalkenylene group, a $C_2$-$C_{10}$ heterocycloalkylene group, a $C_2$-$C_{10}$ heterocycloalkenylene group, a $C_6$-$C_{20}$ arylene group, and a $C_2$-$C_{20}$ heteroarylene group; and a $C_1$-$C_{20}$ alkylene group, a $C_3$-$C_{10}$ cycloalkylene group, a $C_3$-$C_{10}$ cycloalkenylene group, a $C_2$-$C_{10}$ heterocycloalkylene group, a $C_2$-$C_{10}$ heterocycloalkenylene group, a $C_6$-$C_{20}$ arylene group, and a $C_2$-$C_{20}$ heteroarylene group, each substituted with at least one selected from a deuterium, —F, —Cl, —Br, —I, a hydroxyl group, a cyano group, an epoxy group, nitro group, an amidino group, a hydrazino group, a hydrazono group, a $C_1$-$C_{20}$ alkyl group, a $C_1$-$C_{20}$ alkoxy group, a $C_3$-$C_{10}$ cycloalkyl group, a $C_3$-$C_{10}$ cycloalkenyl group, a $C_2$-$C_{10}$ heterocycloalkyl group, a $C_2$-$C_{10}$ heterocycloalkenyl group, a $C_6$-$C_{20}$ aryl group, and a $C_2$-$C_{20}$ heteroaryl group, y1 is an integer of 1 to 5, when y1 is 2 or greater, structures of $X_1$ are identical to or different from each other, y2 is an integer of 1 to 5, when y2 is 2 or greater, structures of $X_2$ are identical to or different from each other, $R_1$ to $R_4$ are each independently selected from:

a hydrogen, a deuterium, a $C_1$-$C_{20}$ alkyl group, a $C_2$-$C_{20}$ alkenyl group, a $C_2$-$C_{20}$ alkynyl group, and a $C_1$-$C_{20}$ alkoxy group; and a $C_1$-$C_{20}$ alkyl group, a $C_2$-$C_{20}$ alkenyl group, a $C_2$-$C_{20}$ alkynyl group, and a $C_1$-$C_{20}$ alkoxy group, each substituted with at least one selected from a deuterium, —F, —Cl, —Br, —I, a hydroxyl group, a cyano group, an epoxy group, a nitro group, amidino group, a hydrazino group, a hydrazono group, a $C_1$-$C_{20}$ alkyl group, and a $C_1$-$C_{20}$ alkoxy group, m1 is an integer of 1 to 10, when m1 is 2 or greater, structures in parentheses are identical to or different from each other, n1 is an integer of 1 to 1,000, when n1 is 2 or greater, structures in parentheses are identical to or different from each other, \* denotes a binding site to the inorganic particles, \*\* denotes a binding site to the polymer matrix, and wherein $X_1$ is bonded to the inorganic particles with a chemical bond directly to oxygen, silicon, or sulfur.

2. The nanocomposite of claim 1, wherein an average particle diameter of the inorganic particles is in a range of about 1 nm to about 100 μm.

3. The nanocomposite of claim 1, wherein an amount of the inorganic particles is in a range of about 10 parts to about 30 parts by weight based on 100 parts by weight of the polymer matrix.

4. A method of manufacturing a nanocomposite, the method comprising:

reacting inorganic particles with a grafting polymer compound comprising polylactic acid (PLA) or represented by Formula 2 to form hybrid nanoparticles, as a first process, wherein the inorganic particles comprise silica ($SiO_2$) particles, titania ($TiO_2$) particles, zinc oxide ($ZnO_2$) particles, zirconia ($ZrO_2$) particles, alumina ($Al_2O_3$) particles, graphene, and/or carbon nanotubes (CNTs); and reacting the hybrid nanoparticles with a polymer matrix comprising polyurethane, polyamide, polycarbonate, polyether, or a combination thereof, as a second process:

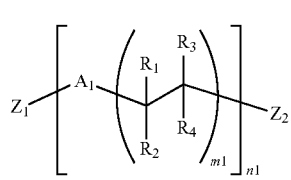

Formula 2 wherein, in Formula 2, $A_1$ is —O— or —C(=O)O—, $R_1$ to $R_4$ are each independently selected from:

a hydrogen, a deuterium, a $C_1$-$C_{20}$ alkyl group, a $C_2$-$C_{20}$ alkenyl group, a $C_2$-$C_{20}$ alkynyl group, and a $C_1$-$C_{20}$ alkoxy group; and a $C_1$-$C_{20}$ alkyl group, a $C_2$-$C_{20}$ alkenyl group, a $C_2$-$C_{20}$ alkynyl group, and a $C_1$-$C_{20}$ alkoxy group, each substituted with at least one selected from a deuterium, —F, —Cl, —Br, —I, a hydroxyl group, a cyano group, an epoxy group, a nitro group, an amidino group, a hydrazino group, a hydrazono group, a $C_1$-$C_{20}$ alkyl group, and a $C_1$-$C_{20}$ alkoxy group, m1 is an integer of 1 to 10, n1 is an integer of 1 to 1,000, $Z_1$ is —O($Q_1$), —S($Q_1$), or an epoxy group, wherein $Q_1$ is selected from a deuterium, —F, —Cl, —Br, —I, a hydroxyl group, a cyano group, a nitro group, an amidino group, a hydrazino group, a hydrazono group, a $C_1$-$C_{60}$ alkyl group, a $C_2$-$C_{60}$ alkenyl group, a $C_2$-$C_{60}$ alkynyl group, a $C_1$-$C_{60}$ alkoxy group, a $C_3$-$C_{10}$ cycloalkyl group, a $C_1$-$C_{10}$ heterocycloalkyl group, a $C_3$-$C_{10}$ cycloalkenyl group, a $C_1$-$C_{10}$ heterocycloalkenyl group, a $C_6$-$C_{60}$ aryl group, a $C_1$-$C_{60}$ heteroaryl group, a monovalent non-aromatic condensed polycyclic group, a monovalent non-aromatic hetero-condensed polycyclic group, a biphenyl group, and a terphenyl group, and $Z_2$ is a substituent that reacts with the polymer matrix, and wherein a reaction product of the reacting of the inorganic particles with the grafting polymer compound comprises a grafting polymer chain of the grafting polymer compound bonded to the inorganic particle with a chemical bond directly to oxygen, silicon, or sulfur, and wherein the inorganic particles comprise a first functional group on a surface thereof and the first functional group reacts with $Z_1$ in Formula 2.

5. The method of claim 4, wherein $Z_2$ is —O($Q_{21}$), —S($Q_{21}$), —N($Q_{21}$)($Q_{22}$), —Si($Q_{21}$)($Q_{22}$)($Q_{23}$), a carbonate group, or an epoxy group, wherein $Q_{21}$, $Q_{22}$, and $Q_{23}$ are each independently selected from a hydrogen, a deuterium, —F, —Cl, —Br, —I, a hydroxyl group, a cyano group, a nitro group, an amidino group, a hydrazino group, a hydrazono group, a $C_1$-$C_{60}$ alkyl group, a $C_2$-$C_{60}$ alkenyl group, a $C_2$-$C_{60}$ alkynyl group, a $C_1$-$C_{60}$ alkoxy group, a $C_3$-$C_{10}$ cycloalkyl group, a $C_1$-$C_{10}$ heterocycloalkyl group, a $C_3$-$C_{10}$ cycloalkenyl group, a $C_1$-$C_{10}$ heterocycloalkenyl group, a $C_6$-$C_{60}$ aryl group, a $C_1$-$C_{60}$ heteroaryl group, a monovalent non-aromatic condensed polycyclic group, a monovalent non-aromatic hetero-condensed polycyclic group, a biphenyl group, and a terphenyl group.

6. The method of claim 4, wherein the first functional group comprises at least one selected from a silanol group, a hydroxyl group, and an alkoxy group.

7. The method of claim 4, wherein an average particle diameter of the inorganic particles is in a range of about 1 nm to about 100 μm.

8. The method of claim 4, wherein the grafting polymer compound is represented by Formula 2 and an amount of the grafting polymer compound represented by Formula 2 is in a range of about 1 part to about 1,000 parts by weight based on 100 parts by weight of the inorganic particles.

9. The method of claim 4, wherein the polymer matrix comprises a second functional group, the second functional group comprises at least one selected from an isocyanate group, an epoxy group, a hydroxyl group, an amine group, and a carbonate group, and the second functional group reacts with $Z_2$ in Formula 2.

10. The method of claim 4, wherein an amount of the hybrid nanoparticles is in a range of about 10 parts to about 50 parts by weight based on 100 parts by weight of the polymer matrix.

11. A nanocomposite film comprising the nanocomposite of claim 1.

12. The nanocomposite film of claim 11, wherein a shore D hardness of the film is in a range of about 30 D to about 60 D.

13. A nanocomposite film comprising a nanocomposite comprising:
   inorganic particles, wherein the inorganic particles comprise silica ($SiO_2$) particles, titania ($TiO_2$) particles, zinc oxide ($ZnO_2$) particles, zirconia ($ZrO_2$) particles, alumina ($Al_2O_3$) particles, graphene, and/or carbon nanotubes (CNTs);
   a polymer matrix comprising polyurethane, polyamide, polycarbonate, polyether, or a combination thereof; and
   grafting polymer chains each of which comprises a polyol structure,
   wherein the grafting polymer chains are bonded to the inorganic particles and the polymer matrix with a chemical bond,
   wherein the grafting polymer chains comprise polyethylene glycol (PEG), polylactic acid (PLA) or are represented by Formula 1:

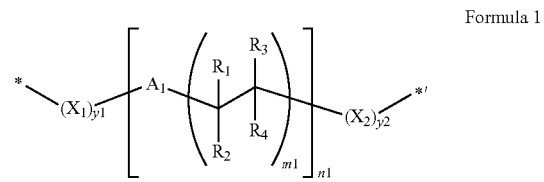

Formula 1 wherein, in Formula 1,
$A_1$ is —O— or —C(=O)O—,
$X_1$ and $X_2$ are each independently selected from:
a single bond, —C(=O)—, —O—, a $C_1$-$C_{20}$ alkylene group, a $C_3$-$C_{10}$ cycloalkylene group, a $C_3$-$C_{10}$ cycloalkenylene group, a $C_2$-$C_{10}$ heterocycloalkylene group, a $C_2$-$C_{10}$ heterocycloalkenylene group, a $C_6$-$C_{20}$ arylene group, and a $C_2$-$C_{20}$ heteroarylene group; and
a $C_1$-$C_{20}$ alkylene group, a $C_3$-$C_{10}$ cycloalkylene group, a $C_3$-$C_{10}$ cycloalkenylene group, a $C_2$-$C_{10}$ heterocycloalkylene group, a $C_2$-$C_{10}$ heterocycloalkenylene group, a $C_6$-$C_{20}$ arylene group, and a $C_2$-$C_{20}$ heteroarylene group, each substituted with at least one selected from a deuterium, —F, —Cl, —Br, —I, a hydroxyl group, a cyano group, an epoxy group, nitro group, an amidino group, a hydrazino group, a hydrazono group, a $C_1$-$C_{20}$ alkyl group, a $C_1$-$C_{20}$ alkoxy group, a $C_3$-$C_{10}$ cycloalkyl group, a $C_3$-$C_{10}$ cycloalkenyl group, a $C_2$-$C_{10}$ heterocycloalkyl group, a $C_2$-$C_{10}$ heterocycloalkenyl group, a $C_6$-$C_{20}$ aryl group, and a $C_2$-$C_{20}$ heteroaryl group,
y1 is an integer of 1 to 5,
when y1 is 2 or greater, structures of $X_1$ are identical to or different from each other,
y2 is an integer of 1 to 5,
when y2 is 2 or greater, structures of $X_2$ are identical to or different from each other,
$R_1$ to $R_4$ are each independently selected from:
a hydrogen, a deuterium, a $C_1$-$C_{20}$ alkyl group, a $C_2$-$C_{20}$ alkenyl group, a $C_2$-$C_{20}$ alkynyl group, and a $C_1$-$C_{20}$ alkoxy group; and
a $C_1$-$C_{20}$ alkyl group, a $C_2$-$C_{20}$ alkenyl group, a $C_2$-$C_{20}$ alkynyl group, and a $C_1$-$C_{20}$ alkoxy group, each substituted with at least one selected from a deuterium, —F, —Cl, —Br, —I, a hydroxyl group, a cyano group, an epoxy group, a nitro group, amidino group, a hydrazino group, a hydrazono group, a $C_1$-$C_{20}$ alkyl group, and a $C_1$-$C_{20}$ alkoxy group,
m1 is an integer of 1 to 10,
when m1 is 2 or greater, structures in parentheses are identical to or different from each other,
n1 is an integer of 1 to 1,000,
when n1 is 2 or greater, structures in parentheses are identical to or different from each other,
* denotes a binding site to the inorganic particles,
*' denotes a binding site to the polymer matrix, and
wherein $X_1$ is bonded to the inorganic particles with a chemical bond directly to oxygen, silicon, or sulfur, and
wherein an elastic modulus of the film is in a range of about 30 MPa to about 100 MPa.

* * * * *